Figures 1, 4:
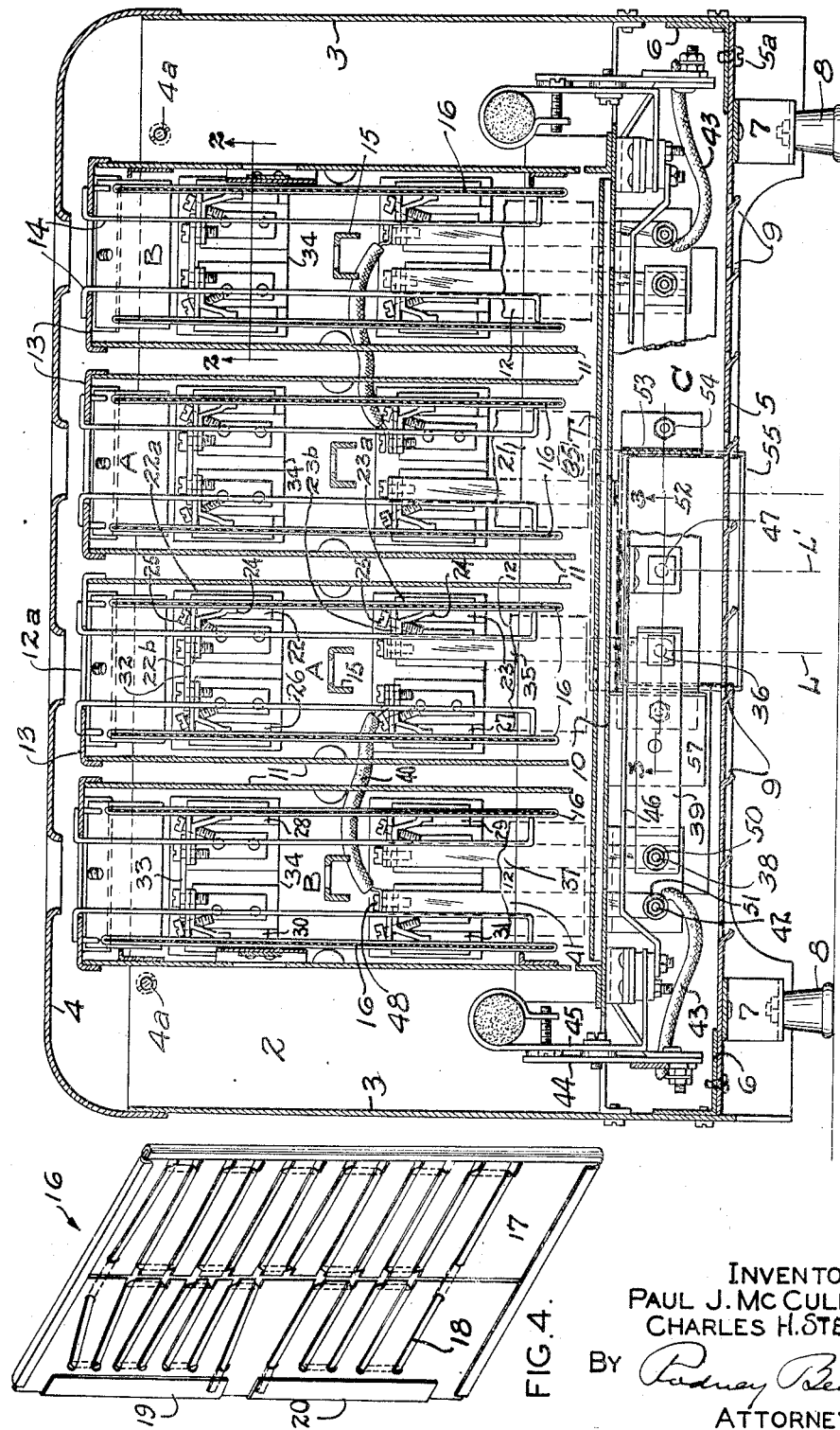

May 20, 1947. C. H. STEUBER ET AL 2,420,727
QUICK CIRCUIT CHANGE FOR ELECTRICALLY ACTUATED DEVICES
Filed May 12, 1943 2 Sheets-Sheet 1

INVENTORS
PAUL J. McCULLOUGH
CHARLES H. STEUBER
BY Rodney Bedell
ATTORNEY

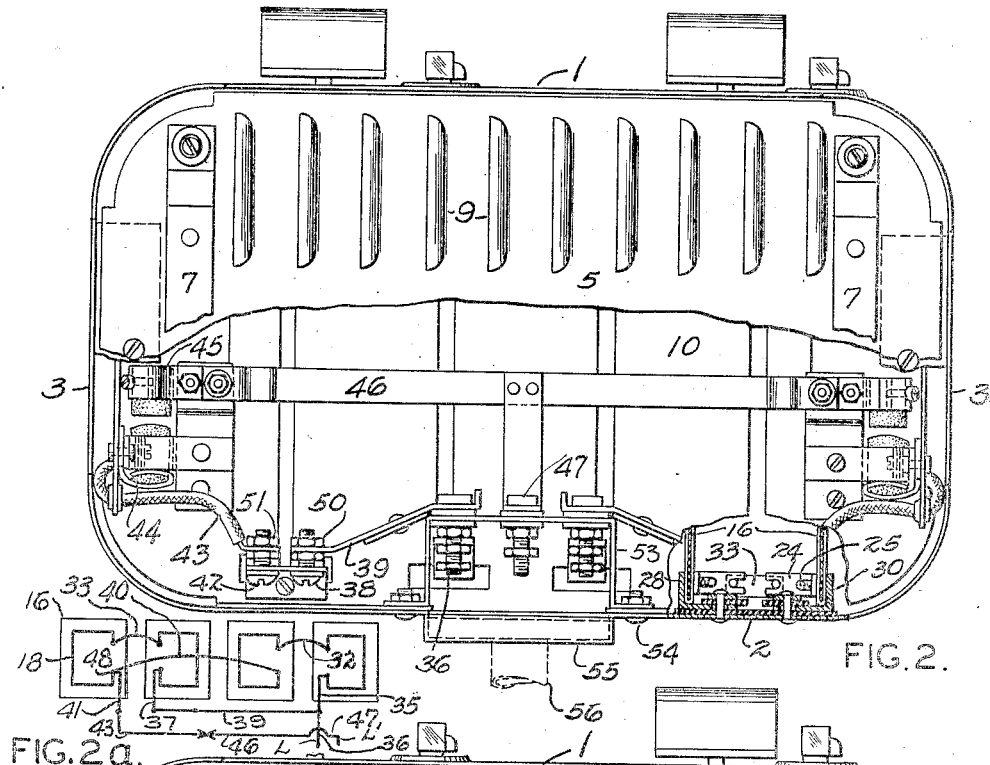
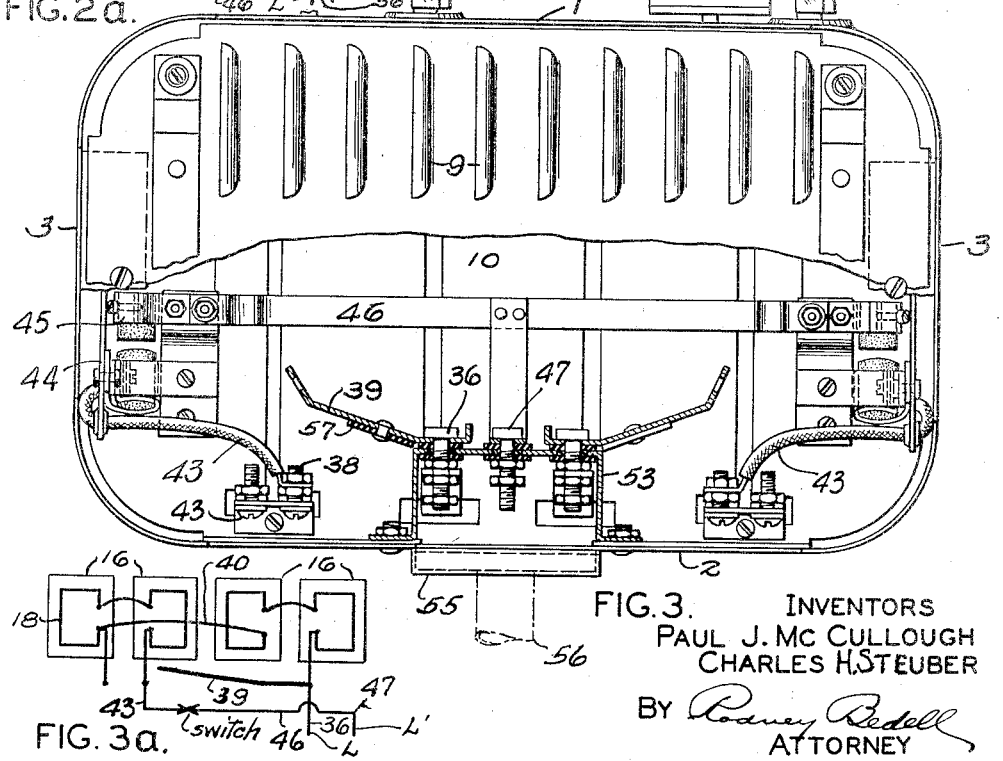

Patented May 20, 1947

2,420,727

UNITED STATES PATENT OFFICE 2,420,727

QUICK CIRCUIT CHANGE FOR ELECTRICALLY ACTUATED DEVICES

Charles H. Steuber and Paul J. McCullough, St. Louis, Mo., assignors to Joseph Pavelka, St. Louis, Mo.

Application May 12, 1943, Serial No. 486,642

3 Claims. (Cl. 171—97)

The invention relates to electric toasters of the general type illustrated and described in McCullough Patent No. 2,253,637, issued August 26, 1941, and consists in novel features of the electric circuits and toaster structure associated therewith referred to below.

One of the objects of the invention is to simplify the construction and assembly of the plate-like heaters with the remainder of the toaster structure and particularly with the remainder of the toaster electric circuits so that the heaters may be readily removed and replaced.

Another object is to readily adapt the toaster for use on a 110 volt supply line or a 220 volt supply line by a simple shifting of interconnected and readily accessible parts.

Another object is to form a simple box-like housing for permanent connections of the toaster circuit to supply lines by using portions of the toaster framing.

These and other detail objects as will appear from the description below are attained by the structure illustrated in the accompanying drawings showing a four-slice toaster, in which—

Figure 1 is a vertical section through the toaster and is taken transversely of the toasting compartments. From an electrical standpoint, the toaster may be considered as consisting of two complete units each having two toasting compartments with a toasting circuit separate from the other two compartments.

Figure 2 is a bottom view of the toaster with a portion of the bottom cover broken away to better illustrate the toaster circuit forming parts behind the same. The circuit forming parts are shown as arranged for a 110 volt supply line. A portion of the structure is sectioned on the line 2—2 of Figure 1 to better illustrate some details of the heater resistance place securing means.

Figure 2a is a wiring diagram for the toaster circuit when the parts are arranged as shown in Figure 2.

Figures 3 and 3a correspond to Figures 2 and 2a with the parts arranged for a 220 volt supply line, and in Figure 3 a portion of the structure is sectioned on the line 3—3 of Figure 1 to better illustrate some details of the connection box.

Figure 4 is an isometric detail of one of the resistance heater plates.

The toaster casing, which may be considered the toaster framing, is preferably of sheet material of substantial thickness and includes an upright front wall 1, a rear wall 2 and end walls 3. A pan-like cover 4 fits over the casing and is detachably secured thereto by readily removable screws 4a. A bottom cover 5 is detachably secured to the casing by screws 5a and angle clips 6 and is provided with offset straps 7 to which supporting feet 8 are attached. The bottom cover is provided with louvers 9 to facilitate ventilation.

A bottom plate 10 extends substantially throughout the length and width of the toaster to form the bottom of the toasting compartments. The space between plates 5 and 10 forms a chamber C for various electrical connections which are readily accessible upon removal of bottom cover 5. A readily removable crumb tray T is slidable through the front wall 1 and over bottom plate 10. The sides of the compartments are formed by partitions 11 and one end of each compartment is formed by an individual plate 12 suspended by a flange 12a from a U-shaped top plate 13 supported on partitions 11. Guard wires 14 suspended from plates 13 extend downwardly at opposite sides of slice carriers 15 which are operated and controlled by mechanism forming no part of the present invention but described and illustrated in the companion application filed herewith, Serial No. 486,641, now Patent No. 2,404,976, issued July 30, 1946.

The heater for each compartment comprises a pair of plate-like devices 16 of familiar construction, one of which is detailed in Figure 4, and comprises one or more sheets 17 of mica or similar insulating material and a continuous length of resistance ribbon 18 wound back and forth across the sheet with its ends united with spaced contact strips 19 and 20 extending along the edge of the sheet. Lower strip 20 may be considered a terminal contact of the double plate heater unit and upper strip 19 may be considered an intermediate contact. Each device 16 is supported by spaced strips 21 notched to receive the lower portion of the device and each device is held in position by a pair of brackets, one above the other, and associated clamps.

The brackets for positioning the right hand device 16 in compartment A are indicated at 22 and 23 and each has an upright flange 22a and 23a respectively and a horizontal flange 22b and 23b respectively. One face of the associated heater device is placed against flanges 22a and 23a. The opposite face of the device is engaged by one leg of an angular clip 24, the other leg of which has a threaded aperture for a screw 25 the head of which is accessible from the top of the compartment when the toaster top cover 4 and the compartment top plate 13 are removed. When screw 25 is tightened, it draws the clip up against the underside of the bracket top flange 22b and, as the angle between the legs of clip 24 is obtuse, such tightening thrusts the downwardly extending leg against the face of the heater device clamping it against the bracket upright flange 22a. The upright flange of bracket 22 and the cooperating clip leg engage the upper contact 19 of the heater device. The upright flange of bracket 23 and the cooperating clip leg engage the lower contact 20 of the device.

Brackets 26, 27, 28, 29, 30 and 31 are constructed and function the same as brackets 22 and 23, each pair of upper and lower brackets being associated with an individual heater device 16. Individual reference numerals are applied to these brackets to facilitate later description of the toaster circuit of which these brackets form portions.

The upper brackets 22 and 26 of compartment A are electrically connected by a strip 32 and the upper brackets 28 and 30 of compartment B are electrically connected by a strip 33. The lower brackets 23 and 27, 29 and 31 are not electrically connected to each other but are electrically connected to other portions of the toaster circuit, as will be described in detail.

Insulation sheets 34 lie between the brackets and rear wall 2 of the toaster and insulate the brackets from the toaster framing. A current conducting strip 35 extends from bracket 23 downwardly through plate 10 into chamber C and terminates at its lower end in a post 36 to which a current supply line L may be attached. A strip 37, corresponding to strip 35, extends downwardly from bracket 29 into chamber C and is provided with a terminal 38. A jumper 39 connects post 36 and terminal 38 (Figures 1, 2 and 2a). A current conducting cable 40 extends from bracket 27 in compartment A to bracket 31 in compartment B. A current conducting strip 41 extends downwardly from bracket 31 through plate 10 into chamber C and has a terminal 42. A conduit 43 connects terminal 42 with one arm 44 of a carbon brush type of switch, the other arm 45 of which is connected to a bus bar 46 leading to a post 47 to which the other current supply line L' may be attached.

The parts just described form two circuits between posts 36 and 47, each circuit including a heater unit consisting of the pair of devices 16 in one of the compartmets. One of the circuits may be considered as beginning with post 47 and continuing through bus bar 46, switch 45, 44, conduit 43, terminal 42, strip 41, bracket 31, terminal contact 20 of the associated heater device 16, ribbon 18, intermediate contact 19, bracket 30, strip 33, bracket 28, intermediate contact 19 of the associated heater 16, ribbon 18, terminal contact 20, bracket 29, strip 37, terminal 38, jumper 39, and ending with post 36. The circuit for the heater of the other compartment branches from strip 41 at the connection 48 to cable 40 and continues through the latter to bracket 27, terminal contact 20 of the associated device 16, ribbon 18, intermediate contact 19, bracket 26, strip 32, bracket 22, intermediate contact 19 of the associated device 16, ribbon 18, terminal contact 20 of the device, bracket 23, strip 35, and post 36. These circuits are indicated diagrammatically in Figure 2a and place the heaters for the two compartments in parallel in the toaster circuit between posts 36 and 47, and this circuit arrangement would be used where the supply lines carry current of 110 volts.

If the supply lines carry 220 volts, the toaster circuits are readily changed to place all the devices 16 of the two compartments in series. This is accomplished as follows:

Nut 50 (Figure 2), securing jumper 39 to terminal 38, is removed, and the jumper is bent to the position shown in Figure 3, thereby breaking the continuity of the circuit through jumper 39. Nut 51 (Figure 2), connecting conduit 43 to terminal 42, is removed, thereby breaking the continuity of the circuit through strip 41, and the corresponding end of conduit 43 is shifted to terminal 38 (Figure 3). This simple change results in the formation of a single continuous circuit through all of the heating devices which may be considered as beginning with post 47 and continuing through bus bar 46, switch 45, 44, conduit 43, terminal 38, strip 37, bracket 29, terminal contact 20 of the associated device 16, ribbon 18, intermediate contact 19 of the device, bracket 28, strip 33, bracket 30, intermediate contact 19 of the associated device 16, ribbon 18, terminal contact 20 of the device, bracket 31, cable 40, bracket 23, terminal contact 20 of the associated device 16, ribbon 18, intermediate contact 19 of the device, bracket 26, connection 32, bracket 22, intermediate contact 19 of the associated device 16, ribbon 18, terminal contact 20 of the device, bracket 23, strip 35 and terminal 36.

The toaster illustrated is of a heavy duty type and is particularly adapted for use in restaurants and like establishments where the toaster is permanently connected to the supply lines as distinguished from the usual domestic type toaster which utilizes a cord having a plug for insertion in a wall socket or like outlet. Hence it is desirable to have a box-like housing for enclosing the ends of the supply wires and the toaster parts to which they are connected.

Accordingly, the lower middle portion of rear wall 2 is provided with a recess 52 extending upwardly to the top of chamber C. A strap 53 is secured at its ends by screws 54 to wall 2 at the opposite sides of the recess and intermediate its ends is offset inwardly of the toaster away from wall 2 to form three upright sides of a housing into which projects posts 36 and 47 with which strips 35 and bus bar 46 are united. A removable cover 55 is detachably secured to wall 2 and is apertured for passage of the wiring conduit 56 enclosing the supply wires. The toaster members 5 and 10 form the top and bottom walls of the connection housing. With this arrangement, a complete box-like housing is provided with a single removable part 55 which may be secured in place after the wiring is permanently connected to posts 36 and 47.

As previously noted, the toaster illustrated, from an electrical standpoint, comprises two complete units distinct from each other except that the bus bar 46, connected to post 47, is common to the two units. Each unit comprises a pair of toasting compartments A and B having individual heaters each comprising a pair of devices 16, one at each side of the slice carrier 15, and the four devices of one unit may be placed in series as a single group for 220 volt operation or may be placed in two parallel groups for 110 volt operation. Effecting the shift from one voltage to the other involves only removing the nuts 50 and 51 on terminals 38 and 42 and shifting conduit 43 from one terminal to the other and applying jumper 39 to terminal 38 (if the 110 volt operation is desired) or leaving one end of jumper 39 disconnected (if the 220 volt operation is desired). A block of stiff insulation 57 attached to jumper 39 and extending substantially beyond the boundaries of the jumper holds the latter against contact with plates 5 or 10 when the jumper is disconnected, as shown in Figure 3.

Each of the heating devices 16 is firmly secured in operating position but is readily detached both electrically and physically from the remainder of the toaster parts for removal and replacement.

The construction eliminates a substantial quantity of wiring previously required in toasters of this type, simplifying the construction and lowering its cost and avoiding the use of materials which are difficult to obtain at this time.

The details of the construction may be varied substantially without change in the essential features, and the exclusive use of those modifications in the structure which come within the spirit of the invention as expressed in the claims is contemplated.

What is claimed is:

1. In a device having a plurality of electrically actuated units each having two terminal contacts, posts for current supply wires, a conduit from one of said posts to one of said contacts on one unit and a connector from said contact to a contact on the other unit, a jumper from said other post to the other contact of said first mentioned unit, and a connector from said latter mentioned post to the remaining contact on said other unit, whereby said units are placed electrically in parallel in the device circuit, said jumper being readily disconnected and moved to non-functioning position, and said conduit being readily disconnected electrically from the contact to which it is connected and moved to the other contact of the same unit, whereby the units are placed electrically in series in the device circuit, and said jumper having a strip of stiff insulation secured thereto and projecting substantially beyond the boundaries of said jumper to insulate said jumper from accidental contact with all parts of the device after disconnecting said jumper and moving it to non-functioning position.

2. In an electrically actuated device adapted for easily changing a parallel circuit to series circuit and vice versa, a jumper adapted to complete the parallel circuit but superfluous in the series circuit, said jumper comprising a flat strip of electrically conducting form-sustaining, bendable material having a flat piece of stiff insulating material attached thereto and projecting substantially beyond the edges of said jumper to insulate said jumper electrically from accidental contact with all parts of the device after disconnecting one end of said jumper and bending it to non-functioning position.

3. In an electrically actuated device adapted for easily changing a parallel circuit to a series circuit and vice versa, a jumper adapted to complete the parallel circuit but superfluous in the series circuit, said jumper comprising a strip of electrically conducting bendable form-sustaining material having thereon a piece of stiff insulating material projecting substantially from said jumper to prevent accidental contact between said jumper and adjacent parts of the device after disconnecting one end of said jumper and bending it to non-functioning position.

CHARLES H. STEUBER.
PAUL J. McCULLOUGH.

REFERENCES CITED

The following references are of record in the file of this patent:

UNITED STATES PATENTS

| Number | Name | Date |
| --- | --- | --- |
| 2,157,417 | Kneisley | May 9, 1939 |
| 2,321,999 | Dalton | June 15, 1943 |
| 2,012,788 | Ireland | Aug. 27, 1935 |
| 2,043,879 | Bentley | June 9, 1936 |